US008221807B2

(12) United States Patent
Sohling et al.

(10) Patent No.: US 8,221,807 B2
(45) Date of Patent: Jul. 17, 2012

(54) USE OF STEVENSITE FOR MYCOTOXIN ADSORPTION

(75) Inventors: Ulrich Sohling, Freising (DE); Agnes Haimerl, Hohenthann (DE)

(73) Assignee: Sud-Chemie AG, Munich (DE)

(*) Notice: Subject to any disclaimer, the term of this patent is extended or adjusted under 35 U.S.C. 154(b) by 1060 days.

(21) Appl. No.: 11/914,144

(22) PCT Filed: May 9, 2006

(86) PCT No.: PCT/EP2006/004333
§ 371 (c)(1),
(2), (4) Date: Apr. 28, 2008

(87) PCT Pub. No.: WO2006/119967
PCT Pub. Date: Nov. 16, 2006

(65) Prior Publication Data
US 2008/0248155 A1    Oct. 9, 2008

(30) Foreign Application Priority Data
May 10, 2005    (DE) .......................... 10 2005 021 578

(51) Int. Cl.
*A23K 1/175*    (2006.01)
*A23K 1/00*    (2006.01)
(52) U.S. Cl. ............. 426/2; 426/271; 426/286; 426/807
(58) Field of Classification Search ............... 426/2, 271, 426/286, 807
See application file for complete search history.

(56) References Cited

U.S. PATENT DOCUMENTS

| | | | |
|---|---|---|---|
| 5,004,716 A | 4/1991 | Ogawa | |
| 5,077,248 A | 12/1991 | Ogawa | |
| 5,149,549 A | 9/1992 | Beggs | |
| 5,165,946 A | 11/1992 | Taylor | |
| 5,192,547 A | 3/1993 | Taylor | |
| 5,304,706 A | 4/1994 | Hooykaas | |
| 5,935,623 A | 8/1999 | Alonso-Debolt | |
| 6,015,816 A * | 1/2000 | Kostyniak et al. | 514/299 |
| 6,288,076 B1 * | 9/2001 | Kostyniak et al. | 514/299 |
| 6,827,959 B1 | 12/2004 | Schall | |
| 2004/0028678 A1 | 2/2004 | Schall | |
| 2005/0029194 A1 | 2/2005 | Hall | |

FOREIGN PATENT DOCUMENTS

| | | |
|---|---|---|
| DE | 19900813 | 7/2003 |
| EP | 0721741 | 7/1996 |
| EP | 1464332 | 10/2004 |
| JP | 01224041 | 9/1989 |
| RU | 2077320 | 4/1997 |
| WO | WO9113555 | 9/1991 |

OTHER PUBLICATIONS

G.W. Brindley, et al., "The nature of kerolite, its relation to talc and stevensite", Mineralogical Magazine, 1977, vol. 41, pp. 443-452.
Gonzales-Pradas, E., et al., "Removal of chloridazon from water by kerolite/stevensite and bentonite: a comparative study", Journal of Chemical Technology & Biotechnology, 2000, Wiley & Sons, Chichester, GB, Bd. 75, Nr. 12, pp. 1135-1140.
Khoury, H.N., et al., "Origin of magnesium clays from the Amargosa Desert, Nevada", Clays and Clay Minerals, Bd. 30, Nr. 5, Oct. 1982, pp. 327-336.
S.L. Lemke, P.G. Grant and T.D. Phillips, "Adsorption of Zearalenone by Organophilic Montmorillonite Clay", Journal of Agricultural and Food Chemistry (1998), pp. 3789-3796.
J.L. Martin De Vidales, et al., "Kerolite-stevensite mixed-layers from the Madrid Basin, central Spain", Clay Minerals (1991), 26(3), pp. 329-342.
A.-J. Ramos, J. Fink-Gremmels, E. Hernandez, "Prevention of toxic effects of mycotoxins by means of nonnutritive adsorbent compounds", Journal of Food Protection, vol. 59(6), 1996, pp. 631-641.
Urena-Amate, M.D., et al., "Effects of ionic strength and temperature on adsorption of atrazine by a heat treated kerolite", Chemosphere, Pergamon Press, Oxford, GB, Bd. 59, Nr. 1, Mar. 2005, pp. 69-74.
Ullmann's Encyclopedia of Industrial Chemistry, vol. 21, 1982, pp. 370-375.
"Understanding and coping with effects of mycotoxins in livestock feed and forage", North Carolina State University. http://www.ces.ncsu.edu/disaster/drought/dro-29.html (last updated Dec. 1994).
English translation of the International Preliminary Report on Patentability pertaining to international application No. PCT/EP2006/004333, filed in the U.S. Appl. No. 11/914,144.

* cited by examiner

*Primary Examiner* — Chhaya Sayala
(74) *Attorney, Agent, or Firm* — Scott R. Cox

(57) ABSTRACT

Applicants have amended the original Application, as filed, to include the appropriate arrangement of the specification, with titles for the appropriate sections, as suggested by the Examiner on pages 3 and 4 of the Advisory Action. No new subject matter is introduced by any of these amendments.

20 Claims, 4 Drawing Sheets

USE OF STEVENSITE FOR MYCOTOXIN ADSORPTION

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION (1) Field of the Invention

The invention relates to the use of stevensite or stevensite-containing components for adsorption of toxins, especially mycotoxins, to a process for improving the utilizability of mycotoxin-contaminated foods or animal feeds, and a food or animal feed formulation comprising a stevensite-containing mycotoxin adsorbent.

(2) Description of Related Art Including Information Disclosed Under 37 CFR 1.97 and 1.98

The term "mycotoxins" encompasses a group of toxic substances which are formed by different naturally occurring fungi. Currently about 300 to 400 mycotoxins are known. The natural habitat of these fungi is considered to be cereal species and cereal grains in general. While some fungal types develop actually on the cereal grain as it is still maturing on the ear, other types principally infest stored cereal animal feed stocks when there is a certain minimum moisture content and ambient temperature.

All so-called mycotoxins have a harmful effect on health primarily on agricultural livestock fed with contaminated cereal types, but secondarily also on the human via the food chain.

Globally, principally the following mycotoxins are of significance with different regional emphasis in animal but also human nutrition: aflatoxin, ochratoxin, fumonisin, zearalenone, deoxynivalenol, T-2 toxin and ergotamine. For further discussion of these and further mycotoxins, reference may be made to WO 00/41806 to the same applicant and the references cited there.

As a result of the development of more sensitive analysis methods, it has been possible to determine, in various animal feeds, several different toxins which have been recognized as a cause of health problems in humans and animals. A series of studies have shown that several toxins can occur simultaneously, for example in animal feeds. This simultaneous occurrence can considerably influence the toxicity of the mycotoxins. In addition to acute damage to livestock which receive mycotoxin-contaminated animal feed, the literature has also discussed health damage to humans, which arises through consumption over a prolonged period of foods slightly contaminated with mycotoxins.

In a more recent analysis of suspect feed samples, aflatoxin, deoxynivalenol or fumonisin were found in over 70% of the samples analyzed (cf. "Understanding and coping with effects of mycotoxins in life dog feed and forage", North Carolina Cooperative Extension Service, North Carolina State Univ.).

In many cases, the economic effects in relation to reduced productivity of the animals, increased occurrence of diseases as a result of immunosuppression, damage to vital organs, and the impairment of reproductivity are more significant than the effects caused by the death of animals as a result of mycotoxin poisoning.

The group of the aflatoxins, owing to its specific molecular structure, is fixed with high specificity on some mineral adsorbents, for example zeolite, bentonite, aluminum silicate and others (cf. A.-J. Ramos, J. Fink-Gremmels, E. Hernandez, "Prevention of Toxic Effects of Mycotoxins by Means of Nonnutritive Adsorbent Compounds", J. of Food Protection, Vol. 59(6), 1996, p. 631-641).

For instance, U.S. Pat. No. 5,149,549 describes and claims the use of bentonite as a mycotoxin adsorbent, but especially an aflatoxin adsorbent, for use in animal feed.

However, the other important mycotoxins listed above are bound to natural mineral adsorbents with only very low effectiveness. In order to improve the adsorption capacity of mineral adsorbents for these non-aflatoxins, various types of surface modifications on natural sheet silicates have been proposed.

S. L. Lemke, P. G. Grant and T. D. Phillips describe, in "Adsorption of Zearalenone by Organophilic Montmorillonite Clay", J. Agric. Food Chem. (1998), p. 3789-3796, an organically modified (organophilic) montmorillonite clay which is capable of adsorbing zearalenone. The use of organically modified sheet silicates or mixtures of organically modified and unmodified sheet silicates is also known from EP 1 150 767 B1 to the same applicant.

However, what is common to the organically modified (organophilic) adsorbents is that they bind only a selection of certain toxins with high effectiveness, while other toxins, for example fumonisin, cannot be bound effectively even as a result of an organophilic surface modification. In addition, the organophilic modification of the sheet silicates is complicated and hence costly.

The use of acid-activated sheet silicates is known from EP 1 333 919 B1 to the same applicant. Although this acid activation enhances the adsorption performance for toxins which can be bound particularly to acidic surfaces (for example fumonisin), the capability of binding other toxins is reduced. Acid activation, like other modifications to the sheet silicates too, is also a complicated and therefore expensive process. The costs of the mycotoxin adsorbent are a significant argument especially in the case of use in the animal feed industry.

BRIEF SUMMARY OF THE INVENTION

It is therefore an object of the invention to provide a mycotoxin adsorbent which avoids the disadvantages of the prior art and enables an efficient adsorption of a very wide spectrum of different mycotoxins, especially also non-aflatoxins, without simultaneously reducing the binding capacity for other toxins, and which can especially be produced inexpensively.

It was a further object to provide a particularly efficient mycotoxin adsorbent for non-aflatoxins (i.e. other mycotoxins apart from aflatoxins), especially T-2 toxins.

This object is achieved by the use of a mycotoxin adsorbent which comprises stevensite or at least one stevensite-containing component. It has thus been found that, surprisingly, a particularly good and inexpensive mycotoxin adsorbent for a wide spectrum of different mycotoxins is obtained when a composition with a sorbent comprising stevensite or at least one stevensite-containing component is used. It has additionally been found that such a composition or such an adsorbent (mycotoxin adsorbent) comprising stevensite can bind non-aflatoxins such as T-2 toxin particularly efficiently.

The person skilled in the art is familiar with what should be understood by "stevensite". A more detailed characterization of stevensite can be found, for example, in J. L. Martin de Vidales et al., Clay Minerals (1991) 26, p. 329-342, and in G. B. Brindley et al., Mineralogical Magazine, 1977, Vol. 41, p. 443-452, to which reference may be made explicitly. The determination of stevensite can be carried out as described there. The characteristic feature is the diffraction peak at lattice spacing (basal spacing) 10 Å, whose position exhibits a significant shift at different moisture contents. Another characteristic feature is the spacing close to 17 Å on treatment with ethylene glycol. Reference is made here explicitly to the X-ray powder diffractograms for stevensite shown in FIG. 2 and the accompanying parts of the text in G. B. Brindley et al. (loc. cit.). According to the invention, the position of the diffraction peak at the lattice spacing of about 10 Å therefore changes characteristically according to FIG. 2 of the reference Brindley et al. (loc. cit.) in the stevensites used in the mycotoxin adsorbent or in the stevensite-containing component at different moisture contents or in the event of treatment with ethylene glycol. By virtue of this, the stevensite used differs, for example, even from pure cerolite.

It has also been found that, surprisingly, efficiency and rate of the binding of both aflatoxins and non-aflatoxins such as ochratoxin, T-2 toxin, zearalenone or fumonisin, by virtue of the inventive stevensite-containing compositions, is significantly better than that of other unmodified minerals or sheet silicates. The latter often exhibit only very poor binding effectiveness, especially for non-aflatoxins. It has thus been found that, unexpectedly, the action of stevensite as a mycotoxin adsorbent, especially for non-aflatoxins, already arises without modification, especially without organic modification (organo-philization), for example with organic onium compounds. Preference is therefore given in accordance with the invention to using the stevensite or the at least one stevensite-containing component in the sorbent or the inventive composition not in organically modified form.

In a preferred embodiment, there is no activation either, especially no acid activation of the stevensite or of the stevensite-containing component, since this is surprisingly not required to achieve advantageous mycotoxin adsorption performances. Moreover, in one embodiment of the invention, it is preferred that no surface-modifying agents or sequestering agents are used either, as known, for example, from WO 91/13555, to modify the stevensite used or the stevensite-containing component(s). However, they may in principle, in another embodiment of the invention, be present in the composition.

BRIEF DESCRIPTION OF THE SEVERAL VIEWS OF THE DRAWING(S)

DETAILED DESCRIPTION OF THE INVENTION

Figure 1:
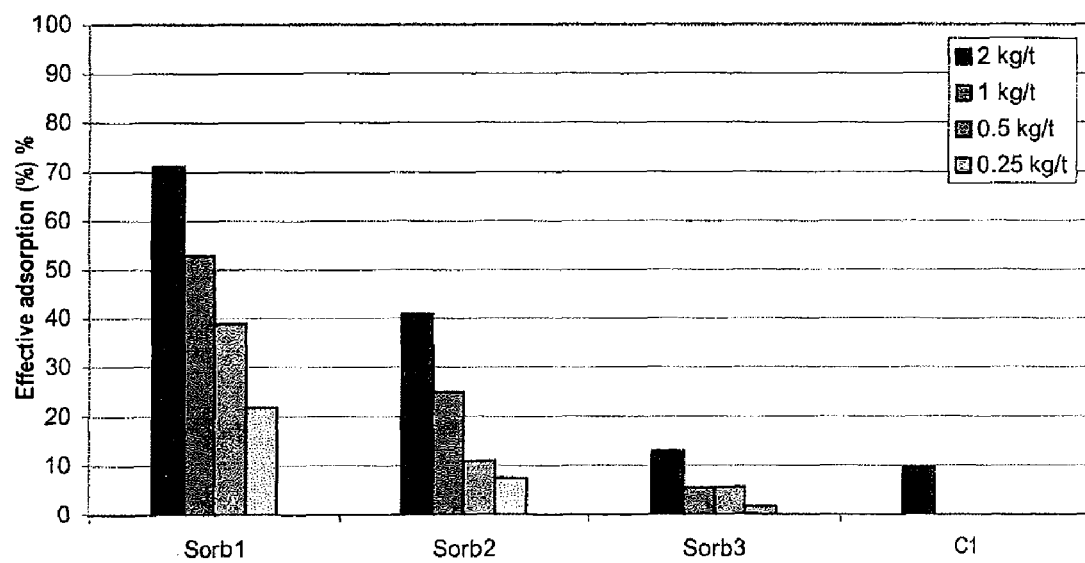
FIG. 1 shows a graphic illustration of the effective adsorption (%) of inventive materials (compositions) (Sorb1 to Sorb3) and a comparative material (C1) for T-2 toxin.

For the sake of simplicity, the expression "stevensite" here shall also include stevensite-containing components. The term "stevensite-containing component" is intended to express that components which, as well as stevensite, also comprise further constituents may also be used in the inventive composition. For example, many commercially available stevensite products, as well as stevensite, also comprise different amounts of accompanying minerals. In addition, blends of stevensite with other constituents, for example other mineral constituents, especially sheet silicates, are also conceivable. The stevensite-containing component preferably comprises at least 5% by weight of stevensite or stevensite phase.

In a preferred embodiment, the inventive composition or the mycotoxin adsorbent consists essentially or completely of stevensite or at least one stevensite-containing component.

In a further preferred embodiment, the composition contains at least 10% by weight, preferably at least 50% by weight, especially at least 75% by weight, more preferably at least 90% by weight, especially preferably at least 95% by weight, of stevensite or at least one stevensite-containing component. It has thus been found that, surprisingly, a particularly good adsorption efficiency is obtained especially for non-aflatoxins such as T-2 toxin, ochratoxin or zearalenone when stevensite constitutes the main phase in mineralogical terms in the materials or components used in accordance with the invention.

In another preferred embodiment of the invention, it is also possible to use materials or mixtures comprising stevensite or at least one stevensite-containing component on the one hand, and cerolite or at least one cerolite-containing component on the other hand. It has thus been found that, surprisingly, such materials or mixtures which comprise both stevensite and cerolite, particularly when used in small amounts or concentrations, already enable outstanding mycotoxin adsorption. In this case, particularly preferred materials contain at least 5% by weight, especially at least 20% by weight, more preferably at least 40% by weight, of cerolite or cerolite phase. What should be understood here by "cerolite" is familiar to those skilled in the art and need not be explained any further here. For example, reference may also be made here to Brindley et al. (loc. cit.). The determination of cerolite can be carried out as described there. The chemical analysis of cerolite gives rise to a composition approximating to $R_3Si_4O_{10}(OH)_2 \cdot H_2O$ where R is mainly Mg and n is from about 0.8 to 1.2. A characteristic feature is the diffraction peak at lattice spacing (basal spacing) of 10 Å, whose position does not exhibit any expansion or any thermal contraction up to 500° C. at different moisture contents. Reference is made here explicitly to the X-ray powder diffractograms for cerolite shown in FIG. 2 and the accompanying parts of the text in G. B. Brindley et al. (loc. cit.). In one possible embodiment of the invention, the stevensite or the at least one stevensite-containing component in the inventive composition is replaced partly or fully by cerolite or at least one cerolite-containing component. The remarks which follow regarding stevensite or a stevensite-containing component therefore apply, in this embodiment, correspondingly to cerolite and a cerolite-containing component.

In the context of the present invention, it has also been found that particularly suitable sorbents or mycotoxin adsorbents (in general: materials) or stevensites or stevensite-containing components are those which have a magnesium oxide content of at least 15% by weight, especially at least 17% by weight, more preferably at least 20% by weight. Corresponding materials, especially stevensites or stevensite-containing components, are commercially available. It is also preferred that the magnesium oxide content of the material used, especially of the stevensite or of the stevensite-containing component, is not more than 40% by weight, especially not more than 35% by weight, in many cases more preferably not more than 30% by weight.

The content of magnesium oxide is also crucial for the exact configuration of the layer structure of the material. It is assumed, without the invention being restricted to the correctness of this assumption, that the layer structure of the material used in accordance with the invention, especially of the stevensite, provides particularly favorable porosimetry and particularly efficient surfaces for adsorption of a multitude of different mycotoxins.

It is additionally preferred that the materials used, especially stevensites or stevensite-containing components, have a BET surface area (measured to DIN 66131, see method part) of at least 80 m$^2$/g, especially at least 100 m$^2$/g, especially at least 110 m$^2$/g. These high BET surface areas apparently enable even more efficient adsorption for some mycotoxins. It has additionally been found that particularly good results are provided especially by those materials which have a cation exchange capacity (CEC) of less than 40 meq/100 g, especially less than 35 meq/100 g, more preferably less than 30 meq/100 g. The CEC can be determined as specified in the method part which follows.

In a further preferred embodiment, the materials or stevensites or stevensite-containing components used are those whose CEC is at least 5 meq/100 g, preferably at least 10 meq/100 g, especially at least 15 meq/100 g.

As mentioned above, the layer structure and composition of the materials used in accordance with the invention provide particularly good prerequisites for mycotoxin adsorption. It has also been found that sheet silicate materials which, in scanning electron micrographs, have a fibrous structure, for example pure sepiolite, enable significantly poorer mycotoxin adsorption. In a preferred embodiment of the invention, the inventive composition or the inventive mycotoxin adsorbent therefore contains less than 20% by weight of fibrous sheet silicates, especially sepiolite, preferably less than 10% by weight, especially less than 5% by weight and more preferably less than 1% by weight. In one embodiment of the invention, no fibrous sheet silicate, especially no sepiolite, is present in the inventive composition or the inventive mycotoxin adsorbent.

In a further embodiment of the invention, it is also possible that the material used in accordance with the invention, especially the stevensite or the at least one stevensite-containing component, is used as an effective and inexpensive substitute for another more costly mycotoxin-adsorbing component in a mycotoxin adsorbent composition, or in order to provide or to improve the adsorption of a particular toxin. For instance, the comparison of the binding capacity of stevensite or stevensite-containing components with that of other adsorbents or mycotoxin adsorbents obtainable on the market shows particularly good binding of toxins including T-2 toxin which is otherwise bound only with difficulty. Such an inventive composition may then also have a lower content of the materials used in accordance with the invention, especially of stevensite or at least one stevensite-containing component, for example in the range from 1 to 50% by weight, preferably from 5 to 30% by weight, especially from 5 to 20% by weight. The exact proportion of materials used in accordance with the invention (stevensite or at least one stevensite-containing component) in the inventive composition will depend in the individual case on the intended use and the other components of the composition.

The materials used in accordance with the invention, especially the stevensite or the stevensite-containing component(s) may be used in any form. Depending on the planned form of the composition, they are preferably used in particulate form. Powders, granules and also shaped bodies are conceivable. Also included are suspensions or slurries. In many cases, it will be the most practical and least expensive option to use the commercially available particle sizes of the clay (stevensite) types. However, the grain or particle size used may also have an influence on the adsorption efficiency.

In a preferred embodiment, the material used, especially the stevensite used or the stevensite-containing component, is used as a powder or granule, though applications in immobilized form on a carrier are also possible. In one possible embodiment of the invention, the mean particle size ($D_{50}$) of the material used in accordance with the invention, especially of the stevensite used or of the stevensite-containing component, is less than or equal to about 100 µm, especially less than or equal to about 80 µm. The wet screen residue on 45 µm is preferably less than about 50%, the dry screen residue on 45 µm less than about 60%. However, other particle sizes are also possible.

In a further preferred embodiment of the invention, as mentioned above, at least one further component may also be present in the inventive composition in addition to the material used in accordance with the invention, especially stevensite or the at least one stevensite-containing component. The additional components will preferably be those which, according to the planned use, provide positive properties without impairing the adsorption efficiency of the material used in accordance with the invention, especially of the stevensite or of the at least one stevensite-containing component in the composition. In particular, it was possible to find outstanding adsorption for non-aflatoxins such as T-2 toxin, ochratoxin or zearalenone.

One group of possible additional components also comprises further mycotoxin adsorbents. It is possible in principle to use any mycotoxin adsorbent known in the prior art. As nonrestrictive examples which may be used particularly advantageously in accordance with the present invention, mention should be made here of acid-activated sheet silicates and organically modified sheet silicates. It has thus also been found in the context of the present invention that blends of the materials used in accordance with the invention, especially of stevensite or at least one stevensite-containing component, with organically modified sheet silicates, as described, for example, in EP 1 150 767 to the same applicant, or acid-activated sheet silicates, as described, for example, in EP 1 333 919 to the same applicant, can give rise to particularly advantageous compositions which can efficiently adsorb a wide spectrum of aflatoxin and non-aflatoxin mycotoxins. The relevant disclosure of EP 1 333 919 A1 and of EP 1 150 767 A1 regarding the mycotoxin adsorbents described there, comprising acid-activated sheet silicates or organically modified sheet silicates, are hereby explicitly incorporated by reference into the present description. The expressions "adsorption" and "absorption" are used herein synonymously. Of particular interest owing to the good adsorption performances and inexpensive preparation are also mixtures of stevensite or of at least one stevensite-containing component with unmodified or organically modified bentonites. The addition of the bentonite serves in particular to increase the binding capacity for aflatoxins further.

When at least one further sheet silicate is present in the inventive composition, it may, in one possible preferred embodiment, be selected from the smectite group, the serpentine-kaolin group, the pyrophyllite group, from the group of the attapulgites/palygorskites, vermiculites, illites, sepiolites and/or the mica-type sheet silicates. The sheet silicates from the group of the smectites include the trioctahedral smectites such as saponite and hectorite, and the dioctahedral smectites such as montmorillonite, beidellite and nontronite. The serpentine-kaolin group includes, for example, chrysotile, antigorite, koalinite and halloysite. The pyrophyllite group includes pyrophyllite. Particularly preferred sheet silicates are montmorillonite clays such as smectites, especially bentonites, and also attapulgite and halloysite and their naturally occurring mixtures. In a preferred embodiment of the invention, the other sheet silicates include a montmorillonite clay, especially a bentonite, or natural mixtures of attapulgite and halloysite and/or of talc or chlorite(s). The further sheet silicate(s) may be unmodified, acid- or alkali-activated and/or organically modified sheet silicates.

When at least one acid-activated sheet silicate is present in the inventive composition, in a preferred embodiment, the sheet silicate may be activated with about only from 0.5% by weight to 8% by weight, especially from 1 to 6% by weight, more preferably from about 1.5 to 4% by weight of acid. The acid action time depends on the amount of acid used and the activation temperature, although activation times of less than two hours, especially of less than 1 hour, are generally sufficient. For example, an activation temperature of below 80° C. can be maintained. All types of acid activation (for example dry mixing with solid acid, spraying or boiling with an acid solution) are possible. The sheet silicate used may, in accordance with the invention, be any phyllosilicate activable with an acid (see also above).

Further possible components of the inventive composition relate, for example, to organic or inorganic components which, according to the prior art, are capable of improving the utilization of contaminated animal feed, of stabilizing the health of the animals, especially their immune system, or of influencing the metabolic processes in a positive manner. These may include: vitamins, enzymes, plant constituents or extracts, and other substances known under the name of probiotics.

In a particularly preferred embodiment of the invention, in addition to or in the inventive composition, further mycotoxin adsorbents, especially a non-acid-activated sheet silicate such as a calcium bentonite or sodium bentonite and/or an organophilic sheet silicate, especially an organophilic bentonite, and/or an acid-activated sheet silicate, especially an acid-activated bentonite, attapulgite or hectorite, are used. The expression "in addition to the inventive composition" is intended to express that the inventive composition can also be used simultaneously or sequentially with other mycotoxin adsorbents or other compositions. One example here is the treatment of animal feed or the feeding of animals. In many cases, it will be advisable or possible to combine the individual mycotoxin adsorbents or components in the inventive composition, especially by adding together or mixing.

In one possible embodiment of the invention, the further mycotoxin adsorbents or components used, as described herein, are thus present as a mixture with or in the composition. Accordingly, the inventive composition is produced, when more than one component is present, for example, by conventional mixing.

In a particularly preferred embodiment of the invention, the inventive compositions are suitable especially for adsorption of mycotoxins from the group of the aflatoxins and of the non-aflatoxins such as ochratoxin, fumonisin, zearalenone, deoxynivalenol, T-2 toxin and ergot toxin. One aspect of the invention thus relates to the use of an inventive composition as defined herein for adsorption of at least one of the above mycotoxins, especially of T-2 toxin, ochratoxin, fumonisin, zearalenone and/or deoxynivalenol. What is particularly advantageous is the simultaneous effective and inexpensive adsorption of aflatoxins and non-aflatoxins, especially fumonisins and toxins from the group of the trichothecenes (deoxynivalenol, T-2 toxin and HT-2 toxin). The inventive composition is preferably used in the case of those substances to be treated (for example foods or animal feeds) which comprise at least one or more than one of the above mycotoxins, especially selected from the group of the aflatoxins, T-2 toxin, citrinin, cyclopiazonoic acid, ochratoxin, patulin, representatives of the trichothecenes such as nivalenol, deoxynivalenol, HT-2 toxin, fumonisins, zearalenone and ergot alkaloids.

In a further aspect, the mycotoxin contamination comprises two or more mycotoxins, especially, as well as aflatoxin(s), also further toxins such as ochratoxin, fumonisin, zearalenone, deoxynivalenol and/or T-2 or T-2-like toxins.

In a preferred embodiment, based on the amount of the mycotoxin-contaminated material, at least 0.01% by weight, preferably at least 0.05% by weight, especially at least 0.1% by weight, of the inventive composition or of the materials used in accordance with the invention is used.

In a further aspect, the invention relates to an animal feed formulation comprising a mycotoxin-contaminated animal feed and an inventive composition as described herein.

Finally, the invention relates, in a further aspect, to a process for better utilizability or improvement of the compatibility for human and animal of a mycotoxin-contaminated animal feed or food. In this case, an inventive composition as described above is added to the animal feed before or simultaneously with consumption by an animal. After this process according to the invention, an improved weight increase can be achieved in the case of feeding of the inventive adsorbent with the mycotoxin-contaminated feed or food.

The parameters specified herein were determined, unless stated otherwise, by the methods specified below.

1. Determination of the Specific Surface Area (BET)

The measurements were carried out with a Micromeritics "Gemini 2360" unit according to DIN 66131.

2. Determination of the Particle Size Distribution (According to Malvern)

The particle size distribution was determined according to Malvern. This is a common process. A Mastersizer from Malvern Instruments Ltd., UK, was used according to the manufacturer's instructions. The measurements were carried out with the sample chamber provided ("dry powder feeder") in air and the values based on the sample volume (including the average particle size $D_{50}$) were determined.

3. Determination of the Cation Exchange Capacity (CEC Analysis) and the Cation Fractions Principle: The clay is treated with a large excess of aqueous $NH_4Cl$ solution and extracted by washing, and the amount of $NH_4^+$ remaining on the clay is determined by means of elemental analysis.

$$Me^+(clay)^- + NH_4^+ \longrightarrow NH_4^+(clay)^- + Me^+$$

$$(Me^+ = H^+, K^+, Na^+, \tfrac{1}{2} Ca^{2+}, \tfrac{1}{2} Mg^{2+} \ldots)$$

Equipment: screen, 63 μm; Erlenmeyer flask with ground-glass joint, 300 ml; analytical balance; membrane suction filter, 400 ml; cellulose nitrate filter, 0.15 μm (from Sartorius); drying cabinet; reflux condenser; hotplate; distillation unit, VAPODEST-5 (from Gerhardt, No. 6550); standard flask, 250 ml; flame AAS Chemicals: 2N $NH_4Cl$ solution Nessler's reagent (from Merck, Art. No. 9028); 2% boric acid solution; 32% sodium hydroxide solution; 0.1 N hydrochloric acid; 0.1% NaCl solution; 0.1% KCl solution.

Procedure: 5 g of clay are screened through a 63 μm screen and dried at 110° C. Thereafter, exactly 2 g are weighed into the Erlenmeyer flask with a ground-glass joint by difference weighing on the analytical balance and admixed with 100 ml of 2 N $NH_4Cl$ solution. The suspension is boiled under reflux for one hour. In the case of bentonites with a high $CaCO_3$ content, ammonia may be evolved. In these cases, $NH_4Cl$ solution has to be added until no ammonia odor is perceptible any longer. An additional check can be carried out with a moist indicator paper. After a duration of approx. 16 h, the $NH_4^+$ bentonite is filtered off through a membrane suction filter and washed with demineralized water (approx. 800 ml) until it is substantially free of ions. The proof that the washing water is free of ions is carried out on $NH_4^+$ ions with the Nessler's reagent which is sensitive therefore. According to the clay type, the number of washes may vary between 30 minutes and 3 days. The extractively washed $NH_4^+$ clay is removed from the filter, dried at 110° C. for 2 h, ground, screened (63 μm screen) and dried once again at 110° C. for 2 h. Thereafter, the $NH_4^+$ content of the clay is determined by means of elemental analysis.

Calculation of the CEC: The CEC of the clay was determined in a conventional manner via the $NH_4^+$ content of the $NH_4^+$ clay, which had been determined by means of elemental analysis of the nitrogen content. To this end, the Vario EL 3 instrument from Elementar-Heraeus, Hanau, Germany, was used according to the manufacturer's instructions. The data are in meq/100 g of clay.

Example: nitrogen content=0.93%;
molecular weight: N=14.0067 g/mol $$CEC = \frac{0.93 \times 1000}{14.0067} = 66.4 \text{ meq}/100 \text{ g}$$

$$CEC = 66.4 \text{ meq}/100 \text{ g of } NH_4^+ \text{ bentonite}$$

The presence of stevensite in a material or a composition used in accordance with the invention can be determined in a conventional manner (by X-ray), as stated in Brindley et al. (loc. cit.) and Martin de Vidales et al. (loc. cit.).

The invention will now be illustrated in a nonrestrictive manner by the examples which follow.

The figures show:

FIG. 1 shows a graphic illustration of the effective adsorption (%) of inventive materials (compositions) (Sorb1 to Sorb3) and a comparative material (C1) for T-2 toxin.

Figure 2:
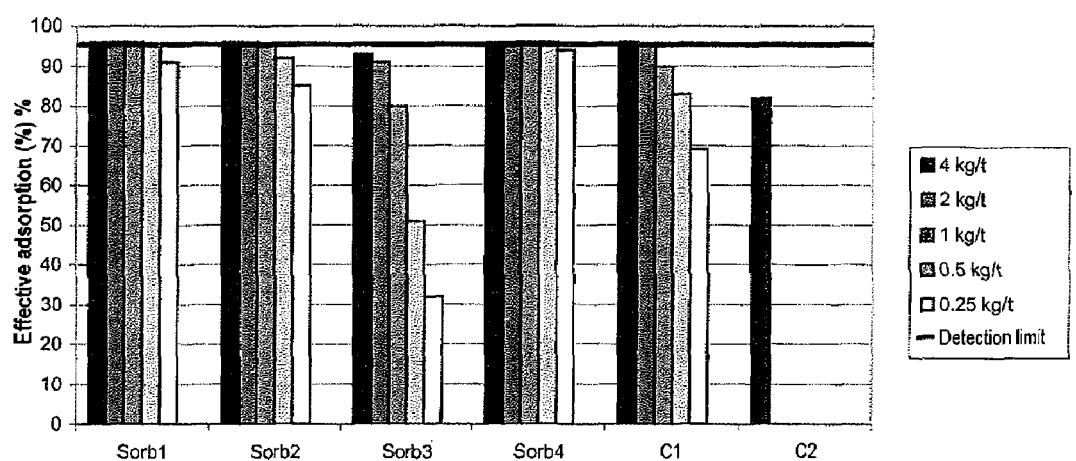
FIG. 2 shows a graphic illustration of the effective adsorption (%) of inventive materials (compositions) (Sorb1 to Sorb4) and two comparative materials (C1 and C2) for aflatoxin B1.

FIG. 2 shows a graphic illustration of the effective adsorption (%) of inventive materials (compositions) (Sorb1 to Sorb4) and two comparative materials (C1 and C2) for aflatoxin B1.

Figure 3:
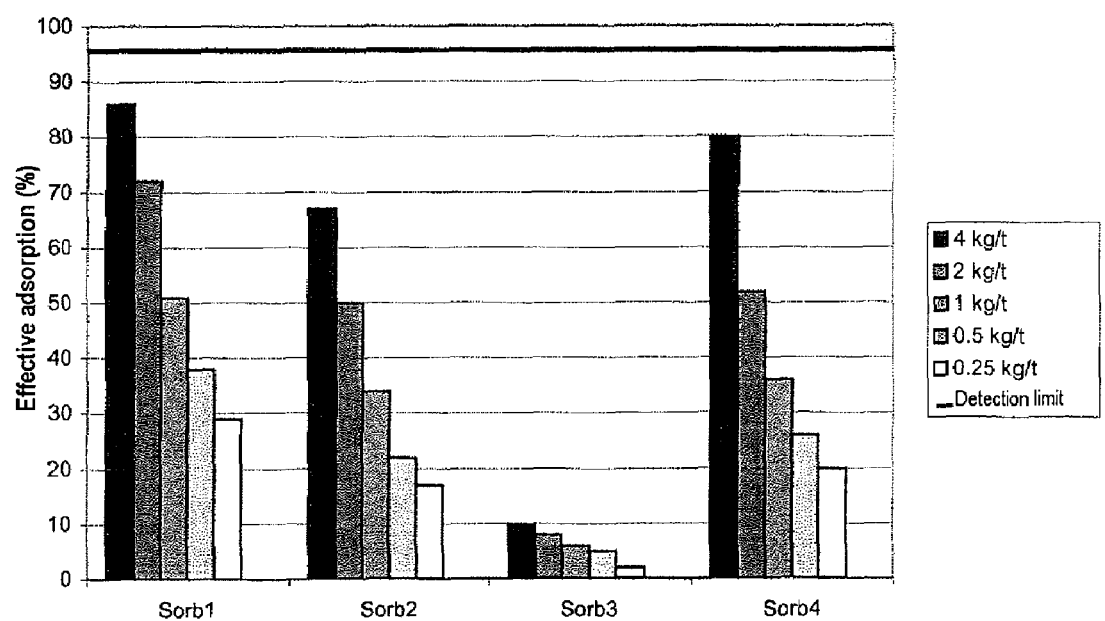
FIG. 3 shows a graphic illustration of the effective adsorption (%) of inventive materials (compositions) (Sorb1 to Sorb4) for ochratoxin.

FIG. 3 shows a graphic illustration of the effective adsorption (%) of inventive materials (compositions) (Sorb1 to Sorb4) for ochratoxin.

Figure 4:
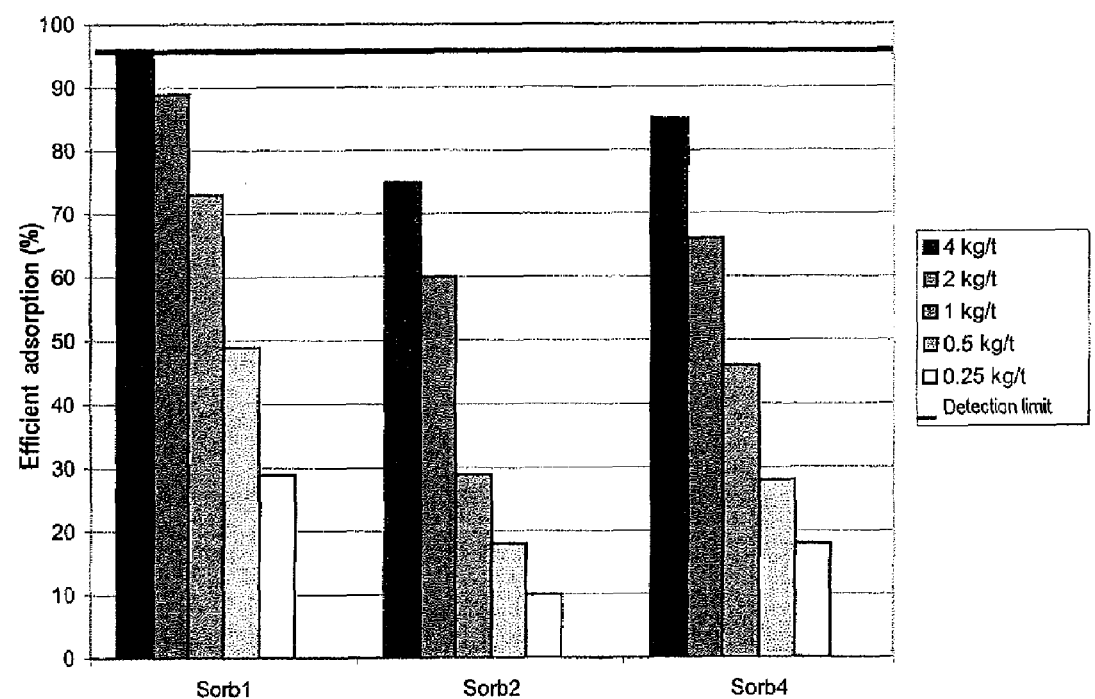
FIG. 4 shows a graphic illustration of the effective adsorption (%) of three inventive materials (compositions) (Sorb1, Sorb2 and Sorb4) for zearalenone.

FIG. 4 shows a graphic illustration of the effective adsorption (%) of three inventive materials (compositions) (Sorb1, Sorb2 and Sorb4) for zearalenone.

EXAMPLES

The different mycotoxins were purchased as crystalline pure substances (SIGMA AG) and taken up in methanol (50 μg/ml). For the performance of the adsorption tests, dilutions were prepared using buffer solutions (citrate buffer), each of which contained 2000 μg of the different mycotoxins per liter.

The adsorption and desorption effectiveness were determined as follows:

1. Testing of the Adsorption Effectiveness:

A) Adsorption

To perform the adsorption tests, aqueous solutions with in each case 2000 ppb of the toxins were prepared. According to the toxin, the solutions were adjusted to pH values between 3 and 5.5 by means of citrate buffer. For ochratoxin, zearalenone, fumonisin, the adsorption at pH 3 is analyzed because these toxins are stable under these conditions. For aflatoxin, pH 5.5 is employed because a rearrangement which disrupts the fluorescence spectroscopy detection occurs at lower pH values. For T-2 toxin, the adsorption at pH 4.5 is analyzed because a conversion to H-T-2 toxin occurs below this pH. This compound is likewise poisonous, but cannot be determined quantitatively as efficiently.

0.1 g of the inventive and noninventive composition (see below) was suspended in each case 25 ml of these solutions, and the mixture was stirred at a temperature of 37° C. over 2 hours. The suspensions were then centrifuged at 2800 rpm for 5 minutes and the clear supernatant was analyzed by means of HPLC analysis for the residual content of unadsorbed mycotoxin. The difference between the amount of toxin initially charged and the amount of toxin still remaining in the solution after the adsorption phase described corresponds to the amount adsorbed and is reported below in % of the amount of toxin initially charged. The mean values of double determinations are reported in each case.

B) Desorption

In a subsequent test, the possible desorption of the toxins adsorbed in the first step is analyzed. To this end, the solid obtained after the centrifugation of the suspension described in A is resuspended in 25 ml of distilled water or citrate buffer and adjusted to pH 7. The now pH-neutral suspension is again stirred at 37° C. for 2 hours and then centrifuged. The amount of desorbed toxin in the clear supernatant is determined by means of HPLC analysis. The amount of toxin found in the solution is compared to the amount of toxin originally used in the adsorption test and reported below in % desorbed toxin. In each case, the mean values from double determinations are reported.

The values for the effective adsorption reported in each case in the tables correspond to the difference of % amount adsorbed minus % amount desorbed. In each case, the mean values from double determinations are reported.

The HPLC determination was effected under the following conditions:

Column: Spherisorb ODS-2 125×4 mm
Aflatoxin:
Derivatization: $F_3CCOOH/CH_3COOH/H_2O$ 2:1:7
Eluent: 75/15/10 water/acetonitrile/methanol
Flow rate: 1.2 ml/min
Detector: fluorescence
Wavelength: EX 364 nm/EM 440 nm
Ochratoxin and zearalenone:
Eluent: 570 ml of acetonitrile/410 ml of water/20 ml of acetic acid
Flow rate: 1.0 ml/min
Detector: fluorescence
Wavelength: EX 274 nm/EM 445 nm Quantitative Determination of the T-2 Toxin Concentration by Means of HPLC:

The supernatants from the adsorption and desorption tests are injected directly into the HPLC. An RP 18 column with a Spheri-5 ODS 2 silica gel is used (manufacturer: Perkin Elmer). The particle size is 5 μm; the column dimensions are 4.6×250 mm. The mobile phase used is a water-methanol-acetonitrile mixture in a ratio of 250:100:100. A flow of 2 ml/min is established. The T-2 toxin is detected by UV spectrometry at 200 nm.

Quantitative Fumonisin Determination by Means of HPLC:

The same HPLC column as already described for T-2 toxin is used here. The aqueous solution which comprises fumonisin is first concentrated by evaporation to dryness and derivatized with naphthalene-dicarboxaldehyde (this enables fluorescence detection of the fumonisin via the derivative), as described in: Bennet, Journal of the AOAC International, Vol 77, No. 2, 1994, pg 501-506. The mobile phase used is an acetonitrile-water-methanol-acetic acid mixture in a ratio of 45:49.3:4.8:0.9. A flow rate of 2.0 mm/min is established. The fumonisin is detected via a fluorescence at 500 nm, which is excited at 420 nm.

The percentage adsorption rates were calculated from the results.

For the tests, the four stevensite-containing materials below were each used as ground raw clays, and the mean particle size ($D_{50}$) for Sorb 1, Sorb 2, Sorb 3 and Sorb 4 was 31 μm, 32 μm, 38 μm and 66 μm respectively. The wet screen residue on 45 μm was in each case less than 50%, the dry screen residue on 45 μm less than 60%. Stevensite as the (main) phase was confirmed according to Brindley et al. (loc. cit.) and Martin de Vidales et al. (loc. cit.). In all materials used (Sorb 1 to Sorb 4), a proportion of cerolite was also detectable. As described in the two references above, stevensite can be distinguished from cerolite and other smectitic sheet silicates, inter alia, with reference to the X-ray powder diffractograms and the shift in the diffraction patterns after treatment with ethylene glycol, after heating and/or at different moisture contents. To characterize the inventive materials, it is additionally possible to employ the magnesium oxide content and the CEC.

The analytical data for the inventive materials used are compiled in Tables 1 to 3 below.

TABLE 1

Analytical data

| | BET surface area, $m^2/g$ | Cation exchange capacity (CEC), meq/100 g |
|---|---|---|
| Sorb1 | 224.2 | 20 |
| Sorb2 | 184.3 | 26 |
| Sorb3 | 180.1 | 33 |
| Sorb4 | 125.3 | 20 |

TABLE 2

Accompanying minerals

| | Accompanying minerals (from X-ray diffractometry) |
|---|---|
| Sorb1 | 1-2% quartz, 1-2% feldspar, 3-4% calcite |
| Sorb2 | 1-2% quartz, 2% feldspar, 1% calcite |
| Sorb3 | 1-2% quartz, 2% feldspar, 6-7% calcite, 2% dolomites |
| Sorb4 | 2-3% quartz, 2-3% feldspar, 0.5-1% calcite |

TABLE 3

Silicate analysis

| | Sorb1 | Sorb2 | Sorb3 | Sorb4 |
|---|---|---|---|---|
| $Al_2O_3$, % | 3.6 | 7.1 | 12.5 | 6.6 |
| $Fe_2O_3$, % | 1.1 | 2.6 | 4.3 | 1.9 |
| CaO, % | 4.8 | 1.7 | 6.4 | 1.1 |
| MgO, % | 25.6 | 22.3 | 10.6 | 26.0 |
| $Na_2O$, % | 0.13 | 0.35 | 0.26 | 0.32 |
| $K_2O$, % | 0.8 | 1.3 | 2.1 | 1.4 |
| $TiO_2$, % | 0.12 | 0.24 | 0.43 | 0.25 |
| $SiO_2$, % | 50.5 | 52.5 | 48.5 | 52.0 |
| $SiO_2/MgO$ ratio | 1.97 | 2.35 | 4.57 | 2.00 |
| Loss on ignition, % | 12.7 | 11.2 | 14.1 | 9.5 |

Example 1

The adsorption effectiveness in the mycotoxin binding for T-2 toxin (here 2000 ppb in the solution) was carried out as specified above. The adsorption was carried out at pH 3, the desorption at pH 6. The comparison used was a mixture of 85% calcium bentonite and 15% SBDMA organic clay (bentonite modified organically with SBDMA) (C1). The values obtained (effective adsorption in %) are summarized graphically in FIG. 1. The dosage (concentration) of the materials used is specified in the figure legend.

FIG. 1 clearly shows the outstanding adsorption performance of the inventive materials Sorb1 to Sorb3 compared to the commercial comparative material according to the prior art, even at low dosages. The materials Sorb1 and Sorb2 with an MgO content of more than 20% by weight (cf. Table 1) were significantly more effective than Sorb3 with an MgO content of only 10.6% by weight.

Example 2

The adsorption effectiveness in the mycotoxin binding for aflatoxin B1 was carried out as specified before Example 1. By way of example, in this example, the calculation of the effective adsorption capacities from the values for the adsorption at pH 5.5 and the desorption at pH 7 is detailed. The comparison used was again a mixture of 85% calcium bentonite and 15% SBDMA organic clay (bentonite modified organically with SBDMA) (C1), and also a commercial talc (mean particle size 2.5 μm) (C2). The values obtained (effective adsorption in %) are summarized graphically in the values (effective adsorption in %) in FIG. 2. The dosage (concentration) of the materials used is specified in the figure legend.

FIG. 2 clearly shows the excellent adsorption performance of the inventive materials Sorb1 to Sorb4. Especially at the low dosages (e.g. 0.25 kg/t), the superior adsorption performance of the inventive materials Sorb1, Sorb2 and Sorb4 having an MgO content of more than 20% by weight (cf. Table 1) compared to comparative materials C1 and C2 is clear. Sorb1 is notable for quite a high cerolite content of more than 40% by weight.

Examples 3 and 4

The adsorption effectiveness in the mycotoxin binding for ochratoxin and zearalenone was carried out as specified before Example 1. By way of example, in this example, the calculation of the effective adsorption capacities from the values for the adsorption at pH 3 and the desorption at pH 7 is detailed. The values obtained (effective adsorption in %) are summarized graphically in FIGS. 3 (ochratoxin) and 4 (zearalenone). The dosage (concentration) of the materials used is specified in the figure legends.

FIGS. 3 and 4 clearly show the good adsorption performance of the inventive materials (compositions) for ochratoxin and zearalenone. Especially the adsorption performance of the inventive materials Sorb1, Sorb2 and Sorb4 with an MgO content of more than 20% by weight (cf. Table 1) is surprisingly good.

In supplementary tests, it was also demonstrated that the inventive materials (Sorb1 to Sorb4) have very good adsorption effectiveness in the mycotoxin binding for fumonisin.

The invention claimed is:

1. A process for the adsorption of aflatoxin mycotoxins and non-aflatoxin mycotoxins selected from the group consisting of ochratoxin, fumonisins, ergot toxin, citrinin, cyclopiazonoic acid, patulin, trichothecenes, T-2 toxin, nivalenol, deoxynivalenol, HT-2 toxin, zearalenone and ergot alkaloids from a mycotoxin containing material comprising adding a composition comprising stevensite only in unmodified form to the mycotoxin containing material.

2. The process as claimed in claim 1, wherein the stevensite in unmodified form is provided in the form of at least one stevensite-containing component.

3. The process as claimed in claim 1, wherein the composition comprises stevensite in unmodified form in an amount from 10% to 100% by weight.

4. The process as claimed in claim 2, wherein the composition comprises at least one stevensite-containing component having a magnesium oxide content from 15% to 40% by weight.

5. The process as claimed in claim 2, wherein the composition, in addition to at least one stevensite-containing component, further comprises cerolite or at least one cerolite-containing component.

6. The process as claimed in claim 2, wherein the at least one stevensite-containing component is used in non-acid-activated form.

7. The process as claimed in claim 2, wherein the at least one stevensite-containing component has a cation exchange capacity (CEC) of at least 5 meq/100 g and less than 40 meq/100 g.

8. The process as claimed in claim 1, wherein the composition does not comprise any fibrous sheet silicates.

9. The process as claimed in claim 1, wherein at least one further sheet silicate is present as a further component in the composition.

10. The process as claimed in claim 9, wherein the at least one further sheet silicate comprises unmodified acid- or alkali-activated and organically modified sheet silicates.

11. The process as claimed in claim 9, wherein the at least one further sheet silicate is selected from the group consisting of the smectites, the attapulgites/palygorskites, the vermiculites, illites, the serpentines/kaolins, the pyrophyllites and mica sheet silicates.

12. The process as claimed in claim 9, wherein the at least one further sheet silicate comprises a montmorillonite clay and natural mixtures of attapulgite and halloysite.

13. The process as claimed in claim 1, wherein the composition further comprises a further mycotoxin adsorbent.

14. The process as claimed in claim 13, wherein the further mycotoxin adsorbent is present in a mixture with the composition.

15. A mycotoxin adsorbent for aflatoxins and non-aflatoxins selected from the group consisting of ochratoxin, fumonisins, ergot toxin, citrinin, cyclopiazonoic acid, patulin, trichothecenes, T-2 toxin, nivalenol, deoxynivalenol, HT-2 toxin, zearalenone and ergot alkaloids comprising stevensite only in unmodified form or stevensite in unmodified form only and an accompanying mineral or a blend of stevensite in unmodified form only and other mineral constituents, wherein said other mineral constituents are selected from the group consisting of cerolites, cerolite-containing components, acid- or alkali-activated sheet silicates, non-acid-activated sheet silicates and organophilic sheet silicates.

16. The mycotoxin adsorbent as claimed in claim 15, further comprising vitamins, trace nutrients and probiotics.

17. An animal feed formulation comprising a mycotoxin-contaminated animal feed and a composition comprising stevensite only in unmodified form.

18. A process for improving the utilizability of a mycotoxin-contaminated animal feed, wherein the composition comprising stevensite only in unmodified form is administered to an animal before, simultaneously or together with, or after the animal feed.

19. The process as claimed in claim 18, wherein the composition is added to the animal feed or mixed with it before it is consumed by an animal.

20. The process of claim 1 wherein the mycotoxin contaminated material comprises animal feed.

* * * * *